R. B. PRICE.
TREATMENT OF TIRES.
APPLICATION FILED MAR. 20, 1915.
1,276,411.
Patented Aug. 20, 1918.
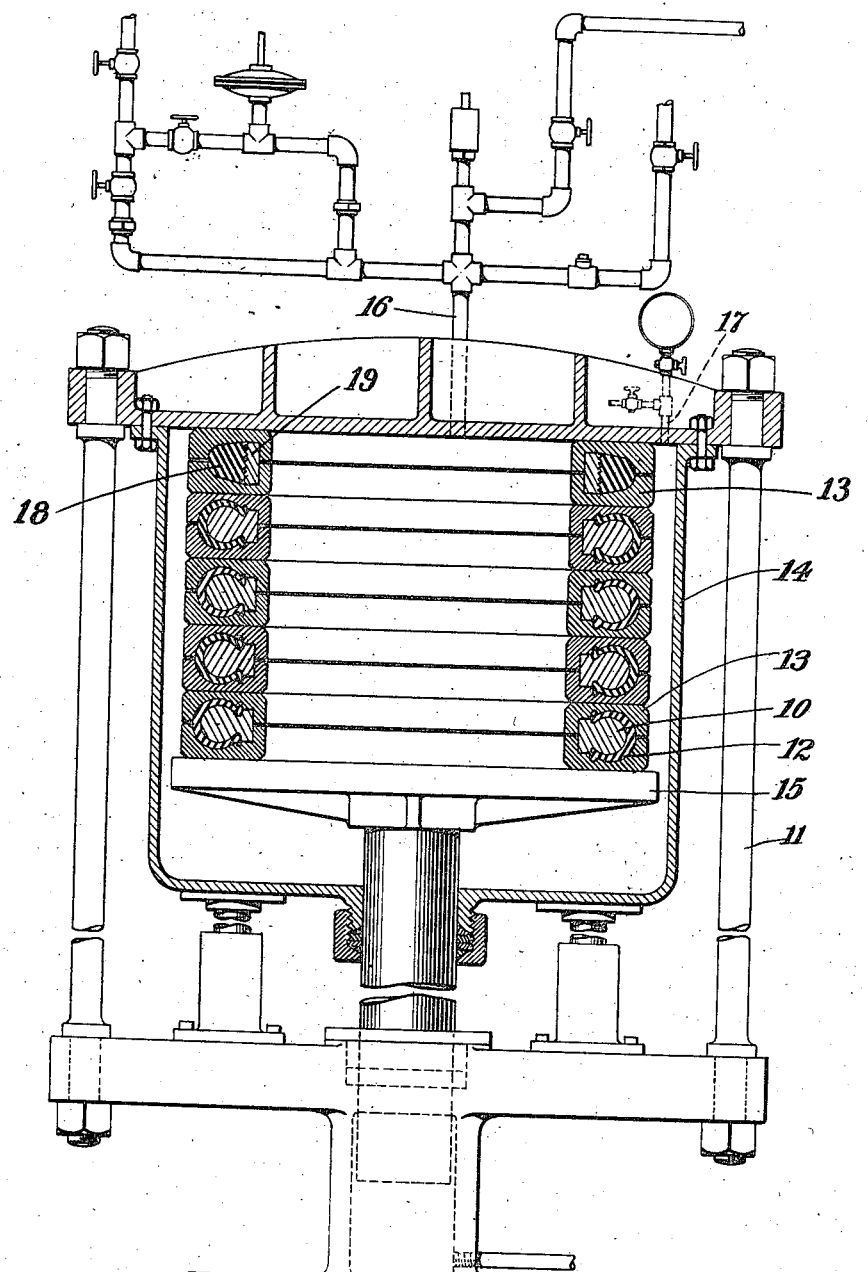
Witness:
S. G. Taylor
Inventor,
Raymond B. Price,
By his Attorney
Ernest Hopkinson

UNITED STATES PATENT OFFICE.

RAYMOND B. PRICE, OF NEW YORK, N. Y., ASSIGNOR TO RUBBER REGENERATING COMPANY, A CORPORATION OF INDIANA.

TREATMENT OF TIRES.

1,276,411.  Specification of Letters Patent.  Patented Aug. 20, 1918.

Original application filed October 9, 1912, Serial No. 724,874. Divided and this application filed March 20, 1915. Serial No. 15,768.

*To all whom it may concern:*

Be it known that I, RAYMOND B. PRICE, a citizen of the United States, residing at New York, county and State of New York, have invented a new and Improved Treatment of Tires, of which the following is a full, clear, and exact description.

My invention relates to the treatment of articles embodying rubber, rubberlike, and similar materials, and to articles produced by this treatment, and contemplates more particularly the subjection of articles of this character to a vacuum during the filling of a mold by which they are pressed into final form, the present application, therefore, being a divisional application of my former application filed October 9, 1912, Serial Number 724,874. Hitherto in the manufacture of such articles, as for instance, in the production of tires and the like, it has been customary to apply the raw or green rubber or like material to a fibrous base or even to a metal base, and impart final form and vulcanization to the article by the closing of a mold thereon during an application of heat and pressure. During this mold cure it was found that entrapped air, gases, fluids, and the like, caused said rubber or like material to blow or become porous and also produced an imperfect union between the base of the article and the rubber, rubberlike, or similar material.

The object of the present invention therefore, is to so treat such an article during or immediately preceding the imparting of final formation and vulcanization to the same, as to remove or withdraw the entrapped air, gases, or other deleterious fluids from and about the rubber or other like material and its base, thus preventing the formation of cells, voids, blisters, and the like, and at the same time securing a better bond between the rubber or other like material and its base.

In the present embodiment of my invention I support the article, as for instance, a tire which includes unvulcanized rubber or other similar material, on the outside of a rigid support, which latter, in the case of a pneumatic tire or casing, will be a ring core, or in the case of a solid tire, will be a metal base, and subject said article to a vacuum. This vacuum I preferably apply while the article thus supported is inclosed in a partly open, rigid mold, by the closing of which final form is to be subsequently given to the article, the condition of the mold permitting of the escape of the entrapped air, gases, or other fluids, under the action of the vacuum.

The vacuum may be applied prior to, or during the pressure cure of the article and is preferably performed in the presence of heat, which warms up the article and urges the entrapped air, gases, or other fluids, to expand and work out more rapidly under the efforts of the vacuum, while the voids left by the entrapped air, close up more rapidly than when the article is cold. This warming up of the article may, however, be performed prior to the application of the vacuum.

One method of carrying the invention into effect is illustrated in the accompanying drawing in connection with an apparatus for the pressure cure of tires.

The figure is a sectional elevation of the apparatus showing tires inclosed in a mold and press.

In the manufacture of pneumatic casings or tires, it is customary to initially build the tire on a rigid ring-core 10, the same preferably having an imperforate exterior of sufficient rigidity to resist the subsequent application of pressure during the cure of the tire in a press, which latter is here indicated in general by the numeral 11. Such a tire, as shown at 12, is composed of rubber, rubberlike, or similar material, applied in part to a fibrous base, such as fabric, and usually termed the carcass of the tire. The tire supported upon its core is then inclosed in a mold 13, which preferably is formed of sections that ultimately are closed by the press and act in conjunction with the core to compact the tire. In the case of solid tires, the rubber, rubberlike, or similar material 18, in an unvulcanized condition, of course, is supported upon a metal base 19, and thus supported, is inclosed in the mold 13, as above described.

In all cases the mold with the tire therein, is placed within the vulcanizing chamber 14 of the press and is subsequently closed by movement of the platen 15, which generally is actuated by hydraulic pressure. Through a controllable connection 16, a heat medium, preferably steam, is let into the vulcanizing chamber about a plurality of such molds at a sufficient temperature, for a sufficient period of time to effect the desired vulcanization while final form is being given to the tire by closing of the mold.

For carrying out the invention, I provide a controllable connection 17 which connects the vulcanizing chamber with a suction pump whereby the interior of the chamber may be exhausted and the tire subjected to a vacuum through the opened mold sections, or through spaces between the sections in case the mold is purposely made to close imperfectly for this purpose.

In carrying out the process the vacuum is exerted through a sufficient period of time to extract the entrapped air, gases, and other deleterious fluids from the tire, this period necessarily varying for the different grades of rubber, rubberlike, or similar material used in different tires.

Preferably the vacuum step is carried out prior to the vulcanizing pressure step, but may be carried out during the last named step so that the tire is vulcanized in the required final form simultaneously with the removal of air, gases, and like fluids therefrom.

Under certain conditions it is desirable to warm the tire during the application of the vacuum step, or even before the vacuum step, whereby the rubber, rubberlike or similar material of the tire is softened and the entrapped air or gases or other fluids expanded and urged out more rapidly through the softened stock under the efforts of the vacuum than when the article is cold. During this warming step the temperature of the heat medium is preferably kept below the vulcanizing temperature, or temperature at which the plastic material of the tire begins to lose its plasticity.

Under certain conditions it may be desirable to intermittently apply the vacuum step and pressure step whereby pressure on the mold sections may be slackened at times to allow the mold to partly open and thus promote the exit of the air, gases, and other fluids under the suction of the vacuum.

While I have described certain preferred sequences at which the various heating, vacuum, and pressure steps of the process may be carried out, I do not intend to limit myself to any specified sequences.

Having described my invention, what I claim and desire to have protected by Letters Patent is:

1. The process of manufacturing tires which consists of assembling the materials placing the tires in open molds in a vulcanizer, thereafter extracting entrapped air, gases, and other fluids by means of reduced pressure exerted substantially over the entire assembled material closing the molds and vulcanizing, whereby the tires are given final formation under compacting pressure of rigid mold walls.

2. The process of manufacturing tires composed of rubber or rubber-like plastic and fiber, which consists in assembling the same in predetermined relationship, placing the tires in open molds in a vulcanizer, thereafter extracting entrapped air, gases, and other fluids by means of reduced pressure exerted substantially over the entire assembled material, closing the molds and vulcanizing, whereby the tires are given final formation under compacting pressure of rigid mold walls.

3. The process of manufacturing tires composed of rubber or rubber-like material and fiber, which consists in assembling the same, placing the tires in open molds in a vulcanizer, thereafter extracting entrapped air, gases, and other fluids therefrom at an elevated temperature by means of reduced pressure exerted substantially over the entire assembled material, closing the molds and vulcanizing, whereby the tires are given final formation under compacting pressure of rigid mold walls.

Signed at New York city, county of New York, and State of New York, this 18th day of March, 1915.

RAYMOND B. PRICE.